(12) United States Patent
Ou-Yang

(10) Patent No.: US 6,465,091 B1
(45) Date of Patent: Oct. 15, 2002

(54) RELEASE ARTICLE AND ADHESIVE ARTICLE CONTAINING A POLYMERIC RELEASE MATERIAL

(75) Inventor: David T. Ou-Yang, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/536,060

(22) Filed: Mar. 27, 2000

(51) Int. Cl.⁷ .................................................. B32B 7/12
(52) U.S. Cl. ...................... 428/352; 428/41.3; 428/41.8; 428/42.3; 428/355 AC
(58) Field of Search ............................. 428/41.3, 41.8, 428/42.3, 352, 355 AC (56) References Cited

U.S. PATENT DOCUMENTS

| | | | |
|---|---|---|---|
| 2,541,498 A | 2/1951 | Calvert | 206/59 |
| 4,070,532 A | 1/1978 | Hammer | 526/11.2 |
| 4,124,431 A | 11/1978 | Schramer et al. | 156/309 |
| 4,151,319 A | 4/1979 | Sackoff et al. | 428/40 |
| 4,299,741 A | 11/1981 | Doehnert | 260/17.4 |
| 4,339,485 A | 7/1982 | Shibano et al. | 156/244.11 |
| 4,425,176 A | 1/1984 | Shibano et al. | 156/244.11 |
| 4,434,261 A | 2/1984 | Brugel et al. | 524/109 |
| 4,525,416 A * | 6/1985 | Hammerschmidt et al. | 428/220 |
| RE32,325 E | 1/1987 | Smith | 524/229 |
| 4,698,372 A | 10/1987 | Moss | 521/145 |
| 4,731,504 A | 3/1988 | Achille et al. | 174/107 |
| 4,775,567 A | 10/1988 | Harkness | |
| 4,992,486 A | 2/1991 | Feinberg | 523/210 |
| 5,178,924 A | 1/1993 | Johnson et al. | 428/40 |
| 5,209,983 A | 5/1993 | Case et al. | 428/514 |
| 5,391,434 A | 2/1995 | Krutzel | 428/412 |
| 5,393,608 A | 2/1995 | Chao | 428/352 |
| 5,436,073 A | 7/1995 | Williams et al. | 428/343 |
| 5,474,820 A | 12/1995 | Murschall et al. | 428/35.7 |
| 5,516,563 A | 5/1996 | Schumann et al. | 428/34.2 |
| 5,538,804 A | 7/1996 | Ogale | 428/515 |
| 5,560,885 A | 10/1996 | Murschall et al. | 264/469 |
| 5,585,193 A | 12/1996 | Josephy et al. | 428/515 |
| 5,629,059 A | 5/1997 | Desai et al. | 428/34.9 |
| 5,728,502 A * | 3/1998 | Ou-Yang et al. | 430/126 |
| 5,817,386 A | 10/1998 | Adamko et al. | 428/41.3 |
| 6,015,603 A | 1/2000 | Ou-Yang | 428/195 |

FOREIGN PATENT DOCUMENTS

| | | |
|---|---|---|
| EP | 0 460 841 | 12/1991 |
| EP | 0 519 611 A2 | 5/1992 |
| EP | 0 519 611 | 12/1992 |
| EP | 0 654 487 | 5/1995 |
| EP | 0 755 780 A1 | 1/1997 |
| EP | 0 802 046 A2 | 10/1997 |
| EP | 1 059 315 | 5/2000 |
| JP | 9143436 | 6/1997 |
| JP | 11-228920 | 8/1999 |
| WO | WO 94/16885 | 8/1994 |
| WO | WO 95/20635 | 8/1995 |
| WO | WO 95/23697 | 9/1995 |
| WO | WO 95/24449 | 9/1995 |
| WO | WO 96/05056 | 2/1996 |
| WO | WO 97/35719 | 10/1997 |
| WO | WO 98/14512 | 4/1998 |
| WO | WO 00/44845 | 8/2000 |

* cited by examiner

*Primary Examiner*—James J. Seidleck
*Assistant Examiner*—Melanie Bissett
(74) *Attorney, Agent, or Firm*—Doreen S L Gwin; Colene H. Blank (57) ABSTRACT

The present invention relates to release articles and adhesive articles comprising a release material comprising a polymer derived from monomers comprising (a) an olefin monomer having a formula $C_nH_{2n}$, (b) an alkyl (meth)acrylate monomer or vinyl acetate monomer, and (c) a polar monomer.

3 Claims, 1 Drawing Sheet

RELEASE ARTICLE AND ADHESIVE ARTICLE CONTAINING A POLYMERIC RELEASE MATERIAL

FIELD OF THE INVENTION

The invention relates to a release material that can be used for a release article or an adhesive article.

BACKGROUND OF THE INVENTION

Release materials are particularly useful as a casting surface for adhesives and foams as well as for coatings for paper and polymer liners for adhesive articles. One type of commercially used release materials contains silicone polymers. Silicone materials, however, have certain deficiencies. The silicone material may migrate into the adhesive resulting in a reduction in adhesive effectiveness and/or may contaminate the finished product in which the adhesive is used. This contamination can interfere with the application of coatings such as paint or cause defects upon storage or use of the final product.

There are other known release materials which do not contain silicone. Examples include release materials disclosed in U.S. Pat. Nos. 4,339,485; 4,425,176; 5,178,924; and 5,167,995. A recent example of a release material is described in U.S. Pat. No. 6,361,844 which describes a release material comprising a polymer comprising an olefin and an alkyl (meth)acrylate.

The industry continues to seek release materials with superior peel values, i.e., low release force (i.e., low adhesion), with no adhesive transfer to the release surface and no release material transfer to the adhesive. Accordingly, an adhesive article using a release material should have consistent adhesive properties after the release material is removed. The adhesive article should also exhibit non-shocky (i.e., smooth and quiet) release upon separation of the adhesive article from the release article. Further, there is an interest in developing a release material in the form of a release liner which has excellent release from different classes of adhesives, for example, a poly-alpha-olefin adhesive.

SUMMARY OF THE INVENTION

The present invention relates to a release article or an adhesive article comprising a release material. The release material may comprise a polymer derived from monomers comprising (a) an olefin monomer, (b) an alkyl (meth) acrylate monomer, i.e., an alkyl acrylate or an alkyl methacrylate, or vinyl acetate monomer, and (c) a polar monomer. In a preferred embodiment, the release material is a terpolymer derived from monomers comprising monomers (a), (b), and (c).

For the purpose of the present invention, the term "polymer" refers to the polymer described as well as derivatives of such polymers and combinations of such polymers and derivatives thereof The term "polymer" refers to a polymerization product of at least one monomer and includes homopolymers, copolymers, and terpolymers. Accordingly, the term "homopolymer" refers to a polymer derived from one monomer; "copolymer" refers to a polymer derived from two different monomers; and "terpolymer" refers to a polymer derived three different monomers.

For the purpose of the present invention, the term "derivative" modifying the term "monomer" or "polymer" refers to such monomer or polymer with at least one moiety and/or group attached to the monomer or the polymer (for example, the backbone or side chain of the polymer). The term "moiety" refers to an unsubstituted hydrocarbyl radical, such as methyl, ethyl, iso-octyl, t-butyl, cyclohexyl, phenyl, etc. The term "group" refers to a chemical species that can be substituted, such as hydrocarbon chains bearing conventional substituents know in the art, such as carbonyl (e.g., aldehydes and ketones), carboxyl (e.g., carboxylic acids, their salts, esters, amides and anhydrides), hydroxy (e.g., aliphatic or aromatic alcohols), alkoxy, aryloxy, phenyl, halo (e.g., chloro and fluoro), cyano, nitro (e.g., nitroalkane), nitrate ester (e.g., alkyl nitrate ester), epoxy (e.g., ethylene oxide, propylene oxide, etc.), sulfonyl, sulfonato, sulfato, amino, silicone, and siloxane.

For the purpose of the present invention, the term "alkyl (meth)acrylate" will be used throughout to designate either an alkyl acrylate or an alkyl methacrylate.

The term "polar" as used herein means that the functional group of the monomer exhibits an increased electronegativity relative to surrounding atoms, and, in particular, relative to adjacent carbon atoms. A polar group preferably includes one or more heteroatoms such as nitrogen, oxygen, and sulfur.

The present invention relates to various release articles and adhesive articles. In one embodiment, the present invention relates to an adhesive article comprising an adhesive composition with a release material thereon; wherein the release material comprises a polymer derived from monomers comprising (a) an olefin monomer having a formula $C_nH_{2n}$ where n ranges from 2 to 20, (b) an alkyl (meth) acrylate monomer or vinyl acetate monomer, and (c) a polar monomer and wherein the adhesive composition is selected to have a release value from the release material, as measured using test method C of ASTM D 3330-90, of greater than zero to about 200 g/2.5 cm.

In another embodiment, the present invention relates to an adhesive article comprising an adhesive composition comprising a poly-alpha-olefin-based adhesive or an acrylate-based adhesive and a release material thereon wherein the release material comprises a polymer derived from monomers comprising (a) ethylene, (b) alkyl (meth)acrylate or vinylacetate, and (c) carbon monoxide.

The present invention also relates to an adhesive article comprising an adhesive composition having a release material thereon, wherein the release material comprises a polymer derived from monomers comprising (a) an olefin monomer having a formula $C_nH_{2n}$ where n ranges from 3 to 20, (b) an alkyl (meth)acrylate monomer or vinyl acetate monomer, and (c) a polar monomer.

The present invention also relates to an adhesive article comprising an adhesive composition having a release material thereon, wherein the release material consists essentially of a polymer derived from monomers comprising (a) an olefin monomer having a formula $C_nH_{2n}$ where n ranges from 2 to 20, (b) an alkyl (meth)acrylate monomer, and (c) a polar monomer.

A release article of the present invention in one embodiment relates to a release article comprising a substrate having opposing first and second major surfaces, wherein the first major surface has a first release material thereon and the second major surface has a second release material thereon, wherein the first release material comprises a polymer derived from monomers comprising (a) an olefin monomer having a formula $C_nH_{2n}$ where n ranges from 2 to 20, (b) an alkyl (meth)acrylate monomer or vinyl acetate monomer, and (c) a polar monomer.

In another embodiment, the present invention relates to a release article comprising a substrate having a release material thereon, wherein the release material comprises a polymer derived from monomers comprising (a) an olefin monomer having a formula $C_nH_{2n}$ where n ranges from 3 to 20, (b) an alkyl (meth)acrylate monomer or vinyl acetate monomer, and (c) a polar monomer.

In yet another embodiment, the present invention relates to an adhesive article comprising a substrate having an adhesive composition thereon, wherein the adhesive composition has a release material thereon, wherein the release material comprises a polymer derived from monomers comprising (a) an olefin monomer having a formula $C_nH_{2n}$ where n ranges from 3 to 20, (b) an alkyl (meth)acrylate monomer or vinyl acetate monomer, and (c) a polar monomer.

The present invention relates to an adhesive article comprising a substrate having an adhesive composition thereon, wherein the adhesive composition has a release material thereon, wherein the release material consists essentially of a polymer derived from monomers comprising (a) an olefin monomer having a formula $C_nH_{2n}$ where n ranges from 2 to 20, (b) an alkyl (meth)aclylate monomer, and (c) a polar monomer.

The present invention also relates to an adhesive article comprising a substrate having an adhesive composition on one major surface and a release material on an opposing major surface, wherein the release material comprises a polymer derived from monomers comprising (a) an olefin monomer having a formula $C_nH_{2n}$ where n ranges from 3 to 20, (b) an alkyl (meth)acrylate monomer or vinyl acetate monomer, and (c) a polar monomer.

In another embodiment, the present invention relates to an adhesive article comprising a substrate having an adhesive composition on one major surface and a release material on an opposing major surface, wherein the release material consists essentially of a polymer derived from monomers comprising (a) an olefin monomer having a formula $C_nH_{2n}$ where n ranges from 2 to 20, (b) an alkyl (meth)acrylate monomer, and (c) a polar monomer.

The present invention also relates to a release article comprising a substrate having a release material thereon, wherein the release material comprises a polymer derived from monomers comprising (a) an olefin monomer having a formula $C_nH_2$, where n ranges from 2 to 20, (b) an alkyl (meth)acrylate monomer, and (c) a polar monomer and wherein the substrate comprises homopolymers, copolymers, and terpolymers of polyethylene, polypropylene, polybutylene, polyamide, polycarbonate, polytetrafluoroethylene, polyester, cellulose acetate; woven materials; nonwoven materials; foils or sheets of metal; glass; or ceramic materials.

The present invention also relates to an adhesive article comprising an adhesive composition having a release article thereon, wherein the release article comprises a substrate and a release material in contact with the adhesive composition; the release material comprises a polymer derived from monomers comprising (a) an olefin monomer having a formula $C_nH_{2n}$ where n ranges from 2 to 20, (b) an alkyl (meth)acrylate monomer, and (c) a polar monomer; and the substrate comprises homopolymers, copolymers, and terpolymers of polyethylene, polypropylene, polybutylene, polyamide, polycarbonate, polytetrafluoroethylene, polyester, cellulose acetate; woven materials; nonwoven materials; foils or sheets of metal; glass; or ceramic materials.

In yet another embodiment, the present invention relates to an adhesive article comprising a substrate having an adhesive composition thereon, wherein the adhesive composition has a release material thereon, wherein the release material comprises a polymer derived from monomers comprising (a) an olefin monomer having a formula $C_nH_{2n}$ where n ranges from 2 to 20, (b) an alkyl (meth)acrylate monomer, and (c) a polar monomer and wherein the substrate comprises homopolymers, copolymers, and terpolymers of polyethylene, polypropylene, polybutylene, polyamide, polycarbonate, polytetrafluoroethylene, polyester, cellulose acetate; woven materials; nonwoven materials; foils or sheets of metal; glass; or ceramic materials.

The present invention also relates to an adhesive article comprising a substrate having an adhesive composition on one major surface and a release material on an opposing major surface, wherein the release material comprises comprises a polymer derived from monomers comprising (a) an olefin monomer having a formula $C_nH_{2n}$ where n ranges from 2 to 20, (b) an alkyl (meth)acrylate monomer, and (c) a polar monomer and wherein the substrate comprises homopolymers, copolymers, and terpolymers of polyethylene, propylene, polybutylene, polyamide, polycarbonate, polytetrafluoroethylene, polyester, cellulose acetate; woven materials; nonwoven materials; foils or sheets of metal; glass; or ceramic materials.

The present invention also relates to a release article comprising a release material and a substrate, wherein the release material comprises a polymer derived from monomers comprising (a) an olefin monomer having a formula $C_nH_{2n}$ where n ranges from 2 to 20, (b) an alkyl (meth) acrylate monomer or vinyl acetate monomer, and (c) a polar monomer and the release article is in roll form.

BRIEF DESCRIPTION OF THE DRAWINGS

The invention will be further explained with reference to the figures, wherein.

These figures are intended to be merely illustrative, are not to scale, and are on-limiting.

DETAILED DESCRIPTION OF THE INVENTION

Release Article

A release article in accordance with the present invention comprises a substrate having a release material thereon and can be used to form a release-coated substrate in a variety of articles, such as a low adhesion backsize (LAB) for tapes such as pressure-sensitive adhesive (PSA) tapes (for example, for rolls of single-sided tape). Other articles in which the release material may be utilized include release liners, labels, wound dressings, and medical grade tapes.

The release articles may be in roll or pad form. In roll form, the release material will be adhered to one side of a substrate and will be wound up so that the release material is in contact with the other side of the substrate and will release therefrom when subject to light hand pressure. The release article in pad form comprises alternating layers of release material and substrates where there are at least two substrates and at least two layers of release material. In other words, the release article pad comprises at least two release articles which each comprise a substrate having a release material thereon which covers at least a portion of a major surface of the substrate.

The release articles of the invention exhibit good receptivity to ink, i.e., the release material can be printed or written on with overall good image quality. Also upon removal of tapes or labels from the release articles, smooth and quiet (i.e., non-shocky) release is preferred, although slightly shocky release is acceptable Shocky release is undesirable because it is not only noisy, but also frequently results in the formation of visible creases or wrinkles in the tape or label.

Figure 1:
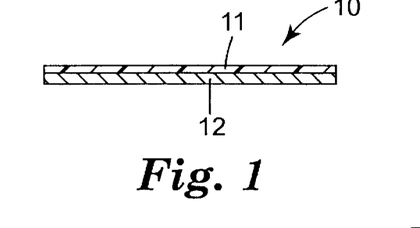
FIG. 1 is a cross-sectional view of a release article according to one embodiment of the present invention.
Figure 2:
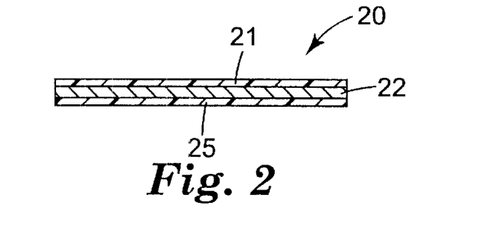
FIG. 2 is a cross-sectional view of a release article according to another embodiment of the present invention.

FIG. 1 shows a release article 10 that may be in the form of a release liner comprising a substrate 12 with a release material 11 thereon. Release material 11 is representative of the release material of the present invention and may be hot melt-coated or solvent-coated onto substrate 12. Alternatively, release material 11 and substrate 12 may be coextruded using a substrate material such as, for example, polypropylene, polyethylene, polybutylene, polyvinyl chloride, or, derivatives thereof In a further embodiment, as shown in FIG. 2, the release article 20 may comprise a first release material 21 on substrate 22 and a second release material 25 on substrate 22 opposite the first release material. Second release material 25 may be chemically the same or different than first release material 21. At least one of first release material 21 and second release material 25 is representative of a release material of the present invention. If one of first release material 21 and second release material 25 is not representative of the release material of the present invention, that release material may comprise any known conventional release material such as polyethylene, polypropylene, fluorochemical release materials, and silicone.

The release article may be in the form of a release liner with differential release In the embodiment depicted in FIG. 2, in order to achieve differential release, first release material 21 has a release or adhesion value that differs from that of second release material 25, even though both materials may be the same or different chemically. The release article may be prepared by hot melt coating or solvent coating the first release material 21 onto one side of substrate 22, followed by hot melt or solvent coating the second release material 25 onto the other side of substrate 22. Alternatively, all three layers may be co-extruded simultaneously to form a release article.

The thickness of the release material may be varied within a very wide range and depends on the end application. For example, the coating thickness may vary from 1 micrometer ($\mu$m) to as thick as desired, preferably 2 to 130 $\mu$m, more preferably 7 to 50 $\mu$m, most preferably 7 to 40 $\mu$m. If the release article is oriented subsequent to extrusion of the release material onto the substrate, the final thickness of the release material may be significantly reduced. The release (i.e., adhesion) value of an adhesive to the release material may vary to some degree depending on the thickness of the release material.

Release Material

A release material is generally non-compatible chemically; with the adhesive from which it is to be cleanly released and provides a temporary protection for the adhesive. A release material of the present invention generally will not transfer to the adhesive, that is, contaminate the adhesive, from which it is to be released.

The release material may comprise a polymer derived from monomers comprising (a) an olefin monomer, (b) an alkyl (meth)acrylate monomer or vinyl acetate monomer, and (c) a polar monomer. A preferred release material comprises a terpolymer derived from monomers comprising monomers (a), (b), and (c). The monomers may be selected in any amounts to achieve the desired release article. The melt temperature of the release material is typically equal to or greater than 50° C. as measured by differential scanning calorimetiy (DSC).

Monomer (a) is an olefin. Typically, monomer (a) has the general formula $C_nH_{2n}$ where n generally ranges from 2 to 20, typically 2 to 12; n may also generally range from 3 to 20, typically 3 to 12. Monomer (a) may comprise ethylene, propylene, butylene, 2-methyl-pentene, hexene, octene, derivatives thereof, or combinations of an olefin or derivatives thereof The olefin content typically is in the range of from about 48 to about 90 weight %, preferably from about 50 to about 75 weight % and more preferably from about 52 to about 67 weight % based on the total weight of the polymer.

Monomer (b) may be a vinyl acetate monomer or an alkyl (meth)acrylate monomer. Typical alkyl (meth)acrylate monomers include those where the alkyl group of the alkyl (meth)acrylate has a carbon number ranging from 1 to 30, preferably 2 to 30, more preferably 4 to 30, most preferably 4 to 20. Preferably, the polymer has an alkyl (meth)acrylate content ranging from about 8 to about 50 weight % based on a total weight of the polymer, more preferably, from 20 to 45 weight %, most preferably 25 to 40 weight %. Particularly preferred alkyl (meth)acrylates include n-butyl acrylates and 2-ethylhexyl acrylates.

Monomer (c) may comprise any suitable polar monomer. Particularly preferred polar monomers include those which have oxygen containing groups, such as carbonyl (e.g., ketones and aldehydes), carboxyl (e.g., carboxylic acids, their salts, such as sodium carboxylate, and their derivatives, such as esters, amides and anhydrides), hydroxyl (e.g., aliphatic or aromatic alcohols), alkoxy or aryloxy, nitro (e.g., nitroalkane), nitrate esters (e.g., alkyl nitrate ester), epoxy (e.g., ethylene oxide, propylene oxide, etc.), sulfonyl, sulfonato, sulfato, silicone and siloxane. Non-limiting examples of preferred polar monomers include carbon monoxide, (meth)acrylic acid, 2-hydroxyethyl acrylate, and vinylidene carbonate. The polar monomer content typically is in the range of about 2 to about 30 weight %, preferably 4 to 20 weight %, based on the total weight of the polymer.

The weight percent of the monomers from which the polymer is derived are selected to equal 100 weight %.

Particularly preferred polymers are terpolymers. Preferred terpolymers include a terpolymer of ethylene/vinyl acetate/carbon monoxide and a terpolymer of ethylene/n-butyl acrylate/carbon monoxide both commercially available from Du Pont Packaging and Industrial Polymers, Wilmington, DE ("Du Pont") under the trade designations "Elvaloy HP741" and "Elvaloy HP441". Exemplary terpolymers are commercially available from Du Pont as terpolymers of ethylene/alkyl acrylate or vinyl acetate/carbon monoxide with varying alkyl acrylate or vinyl acetate and carbon monoxide contents.

Preferably, the polymer has a melt index or melt flow rate, as measured by ASTM D 1238, greater than or equal to about 1 gram/10 minutes (g/10 min), more preferably 2 to 600 g/10 min, most preferably 3 to 350 g/10 min.

The release material may also contain additives. Exemplary additives include ultraviolet light absorbers, ultraviolet light inhibitors, antioxidants, colorants, fluorescent agents, tracers, anti-caking agents, and fillers. Exemplary ultraviolet light absorbers include those available from Ciba-Geigy Corporation, New York City, N.Y. under the trade designation "Tinuvin 325" and "Tinuvin 900" and those available from Clariant Corporation, Charlotte, N.C. under the trade designation "Sandover VSU". Exemplary ultraviolet light inhibitors include those available from Ciba-Geigy under the trade designation "Tinuvin 292" and "Tinuvin 144". Exemplary antioxidants include those available from R. T. Vanderbilt Company, Inc., Norwalk, Conn. under the trade designation "Vanox 1320" and "Vanox ODP". Exemplary colorants (i.e., pigments and dyes) include titanium dioxide available from E.I. Du Pont de Nemours & Company, Wilmington, Del. ("Du Pont") under the trade designation "Ti-Pure R-104". Exemplary fluorescent agents include those available from Ciba-Geigy under the trade designation "Uvitex OB". Exemplary anti-caking agents include silica available from Degussa Corporation, Teterboro, N.J. under the trade designation "Siperant 22" and "Siperant D17". Exemplary fillers include calcium carbonate, for example, available from Georgia Marble Company, Atlanta, Ga. under the trade designation "Gamaco" and "Calwhite", clay, for example, available from Huber Industrial Minerals, Macon, GA under the trade designation "Huber 40C" and "Huber 900", and talc such as that available from Pfizer Minerals, Pigments and Metals Division, New York City, N.Y. under the trade designation "Pfizer CP 38-33".

The release material may further comprise, in addition to the polymer described above, an additional component blended with the polymer. Suitable additional components include homopolymers, copolymers, and terpolymers of an olefin as described above; homopolymers, copolymers, and terpolymers of alkyl (meth)acrylates as described above; vinyl acetate polymers including homopolymers, copolymers, and terpolymers of vinyl acetate; as well as derivatives and/or combinations of such materials. Particular examples of additional components include copolymers and terpolymers of ethylene (meth)acrylic acid, including the metal neutralized form of such copolymers and terpolymers; copolymers and terpolymers of ethylene vinyl acetate; and copolymers and terpolymers of ethylene alkyl (meth) acrylate. Other suitable components include polyvinyl chloride, acrylonitrile-butadiene rubber, and derivatives thereof Exemplary olefin-based additional components include polyethylene, polypropylene, and polybutylene, such as high density polyethylene (HDPE), for example, commercially available from Dow Chemical Company, Midland, Mich. ("Dow") under the trade designation "4352N"; low density polyethylene (LDPE), for example, commercially available from Dow under the trade designation "LDPE 722" (having a melt index of 8.0 g/10 min. and a density of 0.92 g/cm$^3$); linear low density polyethylene (LLDPE), for example, commercially available from Dow under the trade designation "Dowlex 2244" (having a melt index of 3.3 g/10 min. and a density of 0.92 g/cm$^3$); polypropylene, for example, commercially available from Shell Chemical Company, Houston, Tex. ("Shell") under the trade designation "SRD-4-188 (having a melt flow rate of 5.0 g/10 min and a butylene content of 5%); and polybutylene, for example, commercially available from Shell under the trade designation "PB DP-8220".

Other exemplary olefin-based additional components include copolymers of an olefin such as a copolymer of ethylene and any of propylene, butylene, hexene, or octene; or a copolymer of propylene and any of ethylene, butylene, hexene, or octene; or terpolymers of an olefin such as a terpolymer of ethylene, butylene, and hexene. A terpolymer of ethylene, butylene, and hexene is commercially available from Exxon Chemical Company, Houston, TX, under the trade designation "Exact 3034" (having a melt index of 3.5 g/10 min. and a density of 0.902 g/cm$^3$).

Exemplary ethylene vinyl acetate-based additional components include an ethylene vinyl acetate copolymer, for example, commercially available from Du Pont under the trade designation "Elvax 260" or a modified ethylene vinyl acetate copolymer, for example, commercially available from Du Pont under the trade designation "Bynel 3101".

Exemplary ethylene alkyl acrylate-based additional components include an ethylene n-butyl acrylate copolymer, for example, commercially available from Elf Atochem under the trade designations "Lotryl 30BA02" and an ethylene methyl acrylate copolymer, for example, commercially available from Elf Atochem under the trade designation "Lotryl 24MA04".

Substrate for Release Material

The release material of the present invention can be generally used as a release coating for a substrate, which may be, for example, a sheet, a fiber, or a shaped object. One preferred type of substrate is that which is used for adhesive-coated articles (e.g., pressure-sensitive adhesive-coated articles), such as tapes, labels, bandages, and the like. The composition may be applied to at least a portion of at least one major surface (typically the entire surface) of suitable flexible or inflexible substrate materials.

Useful flexible substrate materials include paper; a polymer, for example, in the form of a plastic film, such as homopolymers, copolymers, and terpolymers of polyethylene, polypropylene, polybutylene, polyamide, polyvinylchloride, polycarbonate, polytetrafluoroethylene, polyester (e.g., polyethylene terephthalate), cellulose acetate; woven materials, for example, woven fabric formed of threads of synthetic fibers or natural materials such as cotton or blends of these; nonwoven materials such as nonwoven fabric, for example, air-laid webs of synthetic or natural fibers or blends of these; and the like. Useful inflexible substrate materials, which may be in the form of foils or sheets, include metals such as aluminum and stainless steel, glass, and ceramic materials. Primers known in the art can be utilized to aid in the adhesion of the release coating to the substrate.

When preparing articles containing release-coated substrates, such as tapes, the substrate may be selected from a wide variety of materials to achieve a support layer for the release material. For example, when the release material is co-extruded with the substrate, the substrate typically comprises a hot melt processable polymer, such as a thermoplastic polymer. Representative examples of these materials include polyamides (e.g., nylon); polyolefins (e.g., polyethylene, polypropylene, polybutylene, poly-4-methylpentene and others); polystyrene; polyester; copolyester; polyvinyl chloride; polyethylene vinyl acetate; copolymers (e.g., ethylene propylene copolymer, ethylene butylene copolymer, ethylene hexene copolymer, ethylene octene copolymer, propylene butylene copolymer, and thermoplastic rubber block copolymers); polymethyl methacrylate; and mixtures and copolymers thereof. Especially preferred materials for a substrate include polypropylene, polypropylene blended with other polyolefins, and copolymers of propylene and other alpha-olefins in amounts, for example, of up to about 50% by weight based on total weight of the substrate. Preferred materials for a substrate include semi-crystalline polypropylene having a melting point greater than about 150° C., semi-crystalline polyethylene having a melting point greater than about 100° C., and semi-crystalline or amorphous polyester. Many of the aforementioned polymeric materials are commercially available and may be used without modification. Alternatively, they may be modified in ways well known to one of ordinary skill in the art. For example, the compositions for preparing substrates an be modified with minor amounts of conventional modifiers, for example, colorants (i.e., pigments, dyes), fluorescing agents, antioxidants, and fillers, such as zinc oxide, titanium dioxide, calcium carbonate, hydrocarbon resins, and the like.

When the release material is extrusion-coated onto a pre-existing substrate, the substrate may be selected from the list of thermoplastic materials identified above. Additionally, it may be selected from non-thermoplastic polymers, metals, cloth, non-woven webs (polymeric and non-polymeric), polymeric foam, ceramic, paper, and the like.

In some applications, when the release material is co-extruded with the substrate or is extrusion-coated onto a substrate made from a polymer, it is preferred that the substrate be orientable in at least one direction before or after extrusion of the release coating to form a release-coated oriented substrate or an oriented release-coated substrate. As such, orientable substrates selected from the aforementioned polymeric materials are especially preferred substrates for forming release articles of the present invention. The term "oriented" herein refers to strengthening the polymer by stretching at a temperature below its crystalline melting point. For example, suitable polypropylene substrates can be cast extruded polypropylene films, monoaxially oriented polypropylene (MOPP), sequentially biaxially oriented polypropylene (BOPP), or simultaneously biaxially oriented polypropylene (SBOPP). Suitable polyethylene substrates can be, for example, cast extruded high density polyethylene, medium density polyethylene, low density polyethylene, linear low density polyethylene, monoaxially oriented polyethylene, or biaxially oriented polyethylene.

Hot melt processable tie layers can be used to improve interlayer adhesion between co-extruded release materials and substrates. Examples of suitable tie layers include polyethylene, for example, commercially available from Dow under the trade designations "Dowlex 2244" and "LDPE 722", ethylene vinyl acetate such as that available from Du Pont under the trade designations "Elvax 250" and "Elvax 4260", modified ethylene vinyl acetate copolymers (e.g., Bynel CXA 1123), commercially available from Du Pont, maleated polypropylenes, ethylene acrylic acid copolymers, copolymers of ethylene and alkyl acrylate such as ethylene n-butyl acrylate copolymer, for example, commercially available from Elf Atochem under the trade designations "Lotryl 30BA02" and ethylene methyl acrylate copolymer, for example, commercially available from Elf Atochem under the trade designation "Lotryl 24MA04", and other materials.

Method of Making a Release Article

Preferably, the release material is hot melt coated on a substrate using an extruder. In this manner, the release material can be directly coated subsequent to its "in-situ" preparation from the same piece of processing equipment. However, the release materials may alternatively be coated out of, for example, a suitable organic solvent (e.g., organic solvents in which the release material is soluble), although the release properties may differ from those of release coatings that are formed via hot melt processing. If coated out of solvent, the desired concentration of the release material in a release coating composition made therefrom depends upon the method of coating and upon the desired final coating thickness.

Typically, the release coating composition is coated at about 1% to about 15% solids.

If coating out of solvent, a release coating composition may be applied to a suitable substrate by means of conventional coating techniques, such as wire-wound rod, direct gravure, offset gravure, reverse roll, air-knife, and trailing blade coating. The coating can be dried at room temperature, at an elevated temperature, or a combination thereof, provided that the substrate material can withstand the elevated temperature. Typically, the elevated temperature is about 60° C. to about 130° C. The resulting release coating provides an effective release as, for example, a low adhesion backsize, for a wide variety of conventional pressure-sensitive adhesives, such as adhesives based on natural rubber, acrylic, taclified styrene block polymer, poly(alpha)olefin, silicone, and other synthetic film-forming, elastomeric materials.

The release material may be blended with one or more additional components as described above, when forming a release coating composition. Any suitable method can be used for preparing such blends. For example, blending may be performed by any method that results in a substantially homogenous distribution of the additional components in the release material. For example, the polymer and any additional components of the release material can be melt blended using a twin screw extruder before extrusion coating or in situ, or the pellets of the resins may be dry blended just prior to extrusion coating or in situ. Alternatively, blending can be performed by solvent blending or any other suitable physical means.

A description of a release article in roll or pad form has been described above. To produce a release article in pad form, the alternating layers of substrate and release material may be attached using a pressure sensitive adhesive on a major surface of the substrate opposite the major surface with the release material; it is not necessary for the pressure sensitive adhesive to cover the entire major surface. The pressure sensitive adhesive may be present as a strip on the major surface. The pressure sensitive adhesive may also be present on an edge of the pad to adhere the alternating layers of substrate and release material together.

Adhesive Article

Figure 3:
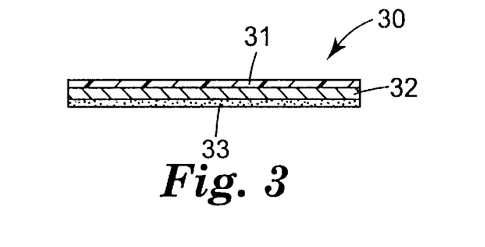
FIG. 3 is a cross-sectional view of an adhesive article according to one embodiment of the present invention.

The release material may be used in conjunction with an adhesive article. The adhesive article may comprise an adhesive composition having a release material thereon. Single-sided tapes can be prepared which include a substrate having an adhesive layer adhered to one side thereof and a release coating on the other side thereof. Tapes can be used in a wide variety of applications such as to adhere two surfaces together (e.g., flaps of packing material) or in the medical area (e.g., wound dressings). The adhesive article may further comprise a substrate in the form of a backing and the release material may be present on the side of the substrate opposite the adhesive composition as depicted in FIG. 3. FIG. 3 shows an adhesive article 30 that may be in the form of a tape with the release material 31 acting as a low adhesion backsize (LAB) with the substrate 32 typically referred to as a backing. The tape may be formed by hot melt or solvent coating release material 31 on one side of substrate 32, followed by hot melt or solvent coating adhesive 33 on the other side of substrate 32. Alternatively, all three layers may be co-extruded simultaneously. The tape may be in roll form or pad form.

Figure 4:
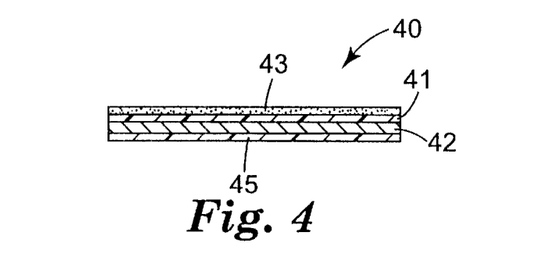
FIG. 4 is a cross-sectional view of an adhesive article according to another embodiment of the present invention.

In an adhesive article 40 as shown in FIG. 4, the release material may be present on the adhesive composition. FIG. 4 depicts an adhesive article comprising a release article in the form of a differential release liner. The release article is similar to the release article shown in FIG. 2 with first release material 41, representative of the release material of the present invention, coated on one side of substrate 42 and second release material 45 coated on the other side of substrate 42. Second release material 45 may be chemically the same or different than first release material 41. As described with respect to FIG. 2, at least one of first release material 41 and second release material 45 is representative of a release material of the present invention. If one of first release material 41 and second release material 45 is not representative of the release material of the present invention, that release material may comprise any known conventional release material such as polyethylene, polypropylene, fluorochemical release materials, ethylene alkyl acrylates, and silicone.

The adhesive article 40 preferably has differential release. In the embodiment depicted in FIG. 4, in order to achieve differential release, first release material 41 has a release or adhesion value that differs from that of second release material 45, even though both materials may be the same or different chemically. Preferably, first release material 41, next to adhesive 43, has a higher adhesion/release value than second release material 45. Adhesive 43 may be in the form of an adhesive film or foam.

Figure 5:
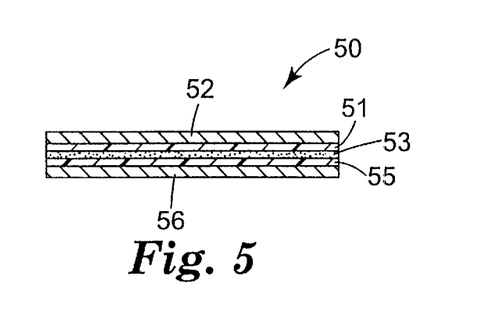
FIG. 5 is a cross-sectional view of an adhesive article according to yet another embodiment of the present invention.

FIG. 5 represents adhesive article 50 comprising a lamination adhesive with two release liners adhered to the lamination adhesive. Each of the release liners has different release properties. A release article comprising first substrate 52 with first release material 51, representative of the present invention, is laminated to one side of adhesive 53 and second substrate 56 with second release material 55 is laminated to the other side of adhesive 53. Second release material 55 may be chemically the same or different than first release material 51. As described with respect to FIG. 2, at least one of first release material 51 and second release material 55 is representative of a release material of the present invention. If one of first release material 51 and second release material 55 is not representative of the release material of the present invention, that release material may comprise any known conventional release material such as polyethylene, polypropylene, fluorochemical release materials, ethylene alkyl acrylates, and silicone.

The adhesive article 50 preferable has differential release. In the embodiment shown in FIG. 5, in order to achieve differential release, first release material 51 has a release or adhesion value that differs from that of second release material 55, even though both materials may be the same or different chemically. Preferably, first release material 51, next to adhesive 53, has a higher adhesion/release value than second release material 55. In use, typically the release material 55 with its substrate 56, acting as a release liner, is removed and the adhesive is applied to an object. Then release material 51 with its substrate 52, acting as a release liner, is removed and another object is applied to the exposed adhesive.

Figure 6:
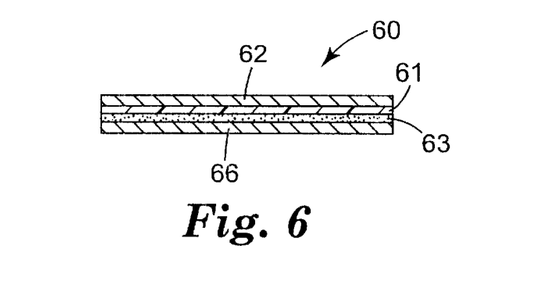
FIG. 6 is a cross-sectional view of an adhesive article according to still another embodiment of the present invention.

FIG. 6 shows an adhesive article 60 that may be in the form of a tape or a label with a release material thereon acting as a release liner. A release material 61 and first substrate 62, which can act as a release liner, are adhered to the adhesive article which comprises adhesive 63 on second substrate 66. The adhesive article is generally formed by coating adhesive 63 on second substrate 66 and then laminating adhesive 63 to the release material 61 on first substrate 62. When the adhesive article of FIG. 6 is a label, adhesive 63 and second substrate 66 typically are referred to as facestock. Labels are formed by die cutting through adhesive 63 of the facestock and to release material 61 of the release liner.

The release material used in conjunction with an adhesive Particle may have substrate thereon as described above, which may be the same or different from the substrate bearing the adhesive composition.

Adhesion or release values, as referenced above, refer to the adhesion or release between a release material and an adhesive. For the purpose of the present invention, preferred adhesion or release values for a release liner, as measured using test method C of ASTM D 3330-90, entitled "Peel Adhesion of Pressure-Sensitive Tape at 180° Angle", at a peel speed of 228.6 cm/min and described in detail below with reference to the examples range from greater than zero to about 200 g/2.5 cm, preferably 5 to 150 g/2.5 cm, more preferably 5 to 100 g/2.5 cm, most preferably 5 to 70 g/2.5 cm. Accordingly, an adhesive article having a release liner may be prepared by selecting the adhesive composition, the release material, or both such that the release value is as described in accordance with ASTM D 3330-90 with respect to using a release liner.

Particularly preferred combinations of release materials and adhesives in preparing an adhesive article with a release liner include ethylene vinyl acetate carbon monoxide or ethylene alkyl(meth)acrylate carbon monoxide as the release material and poly-alpha-olefin-based adhesives and acrylate-based adhesives as the adhesive.

In a preferred embodiment seeking to achieve preferred adhesion or release values for a release liner, where the release material comprises a polymer derived from monomers comprising ethylene, vinyl acetate, and carbon monoxide, the vinyl acetate content is preferably not less than about 22% by weight. Also, where the release material comprises a polymer derived from monomers comprising ethylene, alkyl(meth)acrylate, and carbon monoxide, the alkyl(meth)acrylate content is preferably not less than about 17% by weight and the carbon number of the alkyl group is preferably not more than 30, more preferably 2 to 30, most preferably 4 to 20. In these particularly preferred embodiments, the carbon monoxide content for the release material is preferably about 2 to 30% by weight, more preferably 4 to 20% by weight and the melt index of the release material is preferably greater than about 1 gram/10 minutes, more preferably 2 to 600 grams/10 minutes, most preferably 3 to 350 grams/10 minutes.

For the purpose of the present invention, preferred adhesion or release values for an LAB, as measured using test method C of ASTM D 3330-90, entitled "Peel Adhesion of Pressure-Sensitive Tape at 180° Angle", at a peel speed of 228.6 cm/min and described in detail below with reference to the examples range from about 140 to about 995 g/2.5 cm, preferably 280 to 850 g/2.5 cm, and more preferably 425 to 710 g/2.5 cm. Accordingly, an adhesive article having an LAB may be prepared by selecting the adhesive composition, the release material, or both such that the release value is as described in accordance with ASTM D 3330-90 with respect to using an LAB.

Particularly preferred combinations of release materials and adhesives in preparing an adhesive article with a release material as an LAB include those where the adhesive is a natural rubber-based adhesive, a styrene block polymer-based adhesive, a silicone-based adhesive, and a tackified acrylate-based adhesive.

In a preferred embodiment seeking to achieve preferred adhesion or release values for an LAB, release materials described above are suitable Particularly preferred release materials include a release material comprising a polymer derived from monomers comprising ethylene, alkyl(meth) acrylate, and carbon monoxide. Preferably, in this embodiment, the alkyl(meth)acrylate content is about 8 to 50% by weight and the carbon number of the alkyl group is preferably not more than 30, more preferably 2 to 30, most preferably 4 to 20. In this embodiment, the carbon monoxide content for the release material is preferably about 2 to 30% by weight, more preferably 4 to 20% by weight and the melt index of the release material is preferably greater than about 1 gram/10 minutes, more preferably 2 to 600 grams/10 minutes, most preferably 3 to 350 grams/10 minutes.

When preparing an adhesive article including the release material of the present invention, any suitable adhesive composition can be used. Adhesive compositions useful in the preparation of articles containing the release material of the present invention include hot melt-coated formulations, transfer-coated formulations, solvent-coated formulations, and latex formulations, as well as laminating, thermally-activated, and water-activated adhesives. Examples of suitable adhesives include poly-alpha-olefin-based adhesives, natural or synthetic rubber-based adhesives, styrene block polymer-based adhesives (such as styrene star, linear, or radial block copolymer- or terpolymer-based adhesives), fluorochemical-based adhesives, silicone-based adhesives, and acrylate-based adhesives, including tackified acrylate-based adhesives. The term "based adhesives" with a composition reference prior (such as "poly-alpha-olefin-based adhesives") as used herein refers to an adhesive containing the composition which may or may not contain other additives. Suitable additives for adhesives of the present invention include plasticizers, fillers, antioxidants, stabilizers, pigments, diff-using particles, tackifying resins, hydrocarbon oils, curatives, and solvents. In addition, other adhesives may be blended into the adhesive composition.

Preferred adhesive compositions of the present invention can comprise pressure sensitive adhesives. Pressure sensitive adhesives are normally tacky at room temperature and can be adhered to a surface by application of, at most, light finger pressure. A general description of useful pressure sensitive adhesives may be found in *Encyclopedia of Polymer Science and Engineering*, Vol. 13, Wiley-Interscience Publishers (New York, 1988). Additional description of useful pressure sensitive adhesives may be found in *Encyclopedia of Polymer Science and Technology*, Vol. 1, Interscience Publishers (New York, 1964).

Preferred pressure sensitive adhesives are poly-alpha-olefin pressure sensitive adhesives, natural and synthetic rubber-based adhesives, styrene block polymer-based adhesives, silicone-based adhesives, and acrylate-based adhesives, including tackified acrylate-based adhesives. Particularly preferred poly-alpha-olefin pressure sensitive adhesives include polyhexenes with an inherent viscosity (I.V.) of from about 0.5 deciliter per gram (dL/g) to about 3.0 dL/g.

Adhesive compositions used in the present invention can be extrudable and can be co-extruded with the release material and a substrate material when forming tapes, for example. They may be crosslinked, if desired, after application. While it is preferred that the adhesive be applied by extrusion techniques, however, the adhesive may be applied by a variety of other techniques.

Suitable substrates for the adhesive article may be the same or different from those used for the release article and may include, for example, polyethylene, polypropylene, nylon, polycarbonate, polyvinylchloride, polyester, as well as woven or non-woven webs.

This invention is illustrated by the following examples, but the particular materials and amounts thereof recited in these examples, as well as other conditions and details should not be construed to unduly limit this invention. All percentages and ratios in the examples and elsewhere throughout are by weight unless indicated otherwise. All example numbers having a "C-" preceding the number are comparative examples; all example numbers having a "E-" preceding the number are representative of the present invention.

EXAMPLES

Resins for Release Material

All of the resins in Table I were obtained as pellets from the vendor. Resins A to C, I, and BBB to III were obtained from Du Pont and Resins D to H, J to K, S to X, AA, BB, and NN to TT are commercially available from Du Pont.

Resins L and N were obtained from Exxon Chemical Company, Houston, Tex. (Exxon) and Resins O, P, and GG to KK are commercially available from Exxon.

Resins M, Q, and UU to ZZ are commercially available from Elf Atochem, North America, Inc., Philadelphia, Pa. Resin R is commercially available from Shell Chemical Company, Houston, Tex. Resins Y and Z are commercially available from Eval Company of America, Lisle, Ill. Resins CC to FF, LL, and MM are commercially available from The Dow Chemical Company, Midland, Mich. Resin AAA is commercially available from Union Carbide Corp., Danbury, Conn. The trade designation of each of the resins is indicated in Table I.

The melt index (MI) values in Table I were obtained from the respective vendor's trade literature and measured in g/10 min according to ASTM D 1238.

TABLE I

| Resin | Trade Designation | Composition of the Resin | Alkyl Acrylate or Vinyl Acetate Content (Weight %) | C=O Content (Wt. %) | MI |
|---|---|---|---|---|---|
| A | E9432L36-D | Terpolymer of ethylene/n-butyl acrylate/C=O | 11.1 | 12.7 | 41 |
| B | E9432L36-C | Terpolymer of ethylene/n-butyl acrylate/C=O | 15.8 | 13.5 | 50 |
| C | E9432L36-B | Terpolymer of ethylene/n-butyl acrylate/C=O | 20.6 | 11.6 | 44 |
| D | Elvaloy HP771 | Terpolymer of ethylene/n-butyl acrylate/C=O | 26.0 | 9.0 | 100 |
| E | Elvaloy HP661 | Terpolymer of ethylene/n-butyl acrylate/C=O | 30.0 | 10.0 | 12 |
| F | Elvaloy HP441 | Terpolymer of ethylene/n-butyl acrylate/C=O | 30.0 | 10.0 | 8 |
| G | Elvaloy HP662 | Terpolymer of ethylene/n-butyl acrylate/C=O | 30.0 | 10.0 | 25 |
| H | Fusabound MG423D | Terpolymer of ethylene/n-butyl acrylate/C=O | 30.0 | 10.0 | 8 |
| I | E90444-79K | Terpolymer of ethylene/isooctyl acrylate/C=O | 30 | 7.0 | 5.0 |
| J | Elvaloy HP741 | Terpolymer of ethylene/vinyl acetate/C=O | 24.0 | 10.0 | 35 |
| K | Elvaloy HP742 | Terpolymer of ethylene/vinyl acetate/C=O | 28.0 | 10.0 | 35 |
| L | XW25.AL | Copolymer of ethylene and n-butyl acrylate | 25 | — | 8 |
| M | Lotryl 30BA02 | Copolymer of ethylene and n-butyl acrylate | 30.0 | — | 2 |
| N | XW24.AL | Copolymer of ethylene and n-butyl acrylate | 31.5 | — | 2 |
| O | Enable 33330 | Copolymer of ethylene and n-butyl acrylate | 33.0 | — | 330 |
| P | Enable 33900 | Copolymer of ethylene and n-butyl acrylate | 33.0 | — | 900 |
| Q | Lotryl 35BA40 | Copolymer of ethylene and n-butyl acrylate | 35.0 | — | 40 |
| R | Carilon D26VM100 | Copolymer of ethylene and C=O | — | 50.0 | 60 |
| S | Surlyn 1705 | Ionomer (copolymer of ethylene and methacrylic acid neutralized with zinc) | — | — | 5.5 |
| T | Surlyn 1702 | Ionomer (copolymer of ethylene and methacrylic acid neutralized with zinc) | — | — | 14 |
| U | Nucrel 3990 | Copolymer of ethylene and 9.0% acrylic acid | — | — | 10.5 |
| V | Nucrel 0407 | Copolymer of ethylene and 4.0% methacrylic acid | — | — | 7 |
| W | Nucrel 0910 | Copolymer of ethylene and 8.1% methacrylic acid | — | — | 10 |
| X | Nucrel 1207 | Copolymer of ethylene and 12.0% methacrylic acid | — | — | 7 |
| Y | EC-G-156-G | Copolymer of 48% ethylene and vinyl alcohol | — | — | 6.4 |
| Z | EP-F-104-AW | Copolymer of 32% ethylene and vinyl alcohol | — | — | 4.4 |
| AA | Surlyn 1605 | Ionomer (copolymer of ethylene and methacrylic acid neutralized with sodium) | — | — | 2.5 |
| BB | Surlyn 1652 | Ionomer (copolymer of ethylene and methacrylic acid neutralized with zinc) | — | — | 5.2 |
| CC | Engage 8445 | Linear Low Density Polyethylene (LLDPE) (density of 0.910) | — | — | 3.5 |
| DD | Engage 8550 | LLDPE (density of 0.902) | — | — | 4.3 |
| EE | Engage 8411 | LLDPE (density of 0.880) | — | — | 18.0 |
| FF | Engage 8200 | LLDPE (density of 0.870) | — | — | 5.0 |
| GG | Exact 3024 | LLDPE (density of 0.905) | — | — | 4.5 |
| HH | Exact 3027 | LLDPE (density of 0.900) | — | — | 3.5 |

TABLE I-continued

| Resin | Trade Designation | Composition of the Resin | Alkyl Acrylate or Vinyl Acetate Content (Weight %) | C=O Content (Wt. %) | MI |
|---|---|---|---|---|---|
| II | Exact 4011 | LLDPE (density of 0.888) | — | — | 2.2 |
| JJ | Exact 3131 | LLDPE (density of 0.900) | — | — | 3.5 |
| KK | Exact 4150 | LLDPE (density of 0.895) | — | — | 3.5 |
| LL | Dow HDPE 4352N | High density polyethylene (density of 0.952) | — | — | 4.0 |
| MM | Dow LDPE 5101 | Low density polyethylene (density of 0.919) | — | — | 1.9 |
| NN | Bynel CXA E-369 | Copolymer of ethylene and vinyl acetate modified with acrylic acid | — | — | 6.5 |
| OO | Bynel CXA E-214 | Copolymer of ethylene and vinyl acetate modified with methacrylic acid | — | — | 7.9 |
| PP | Bynel CXA 1123 | Copolymer of ethylene and vinyl acetate modified with acrylic acid | — | — | 6.6 |
| QQ | Elvax 3174 | Copolymer of ethylene and vinyl acetate | 18.0 | — | 8.0 |
| RR | Elvax 3175 | Copolymer of ethylene and vinyl acetate | 28.0 | — | 6.0 |
| SS | Elvaloy HP AS | Copolymer of ethylene and vinyl acetate modified with maleic anhydride | 28.0 | — | 12.0 |
| TT | Elvaloy HP551 | Terpolymer of ethylene/n-butyl acrylate/C=O | 30.0 | 10.0 | 25.0 |
| UU | Lotryl 15MA03 | Copolymer of ethylene and methyl acrylate | 15.0 | — | 3.0 |
| VV | Lotryl 18MA02 | Copolymer of ethylene and methyl acrylate | 18.0 | — | 2.0 |
| WW | Lotryl 24MA07 | Copolymer of ethylene and methyl acrylate | 24.0 | — | 7.0 |
| XX | Lotryl 28MA07 | Copolymer of ethylene and methyl acrylate | 28.0 | — | 7.0 |
| YY | Lotryl 17BA04 | Copolymer of ethylene and n-butyl acrylate | 17.0 | — | 4.0 |
| ZZ | Lotryl 28BA125 | Copolymer of ethylene and n-butyl acrylate | 28.0 | — | 175.0 |
| AAA | DFDA 9169 | Copolymer of ethylene and ethyl acrylate | 18.0 | — | 20.0 |
| BBB | E-90444-79F | Terpolymer of ethylene/isooctyl acrylate/14% caprolactone acrylate | 29.0 | — | 9.0 |
| CCC | E-90444-79H | Copolymer of ethylene and isooctyl acrylate | 34.0 | — | 19.0 |
| DDD | E-90444-79L | Terpolymer of ethylene/isooctyl acrylate/C=O | 28.0 | 12.0 | 3.0 |
| EEE | E-94693-18A | Copolymer of ethylene and isooctyl acrylate | 36.0 | — | 39.0 |
| FFF | E-94693-18B | Copolymer of ethylene and isooctyl acrylate | 45.0 | — | 42.0 |
| GGG | E-94693-18C | Terpolymer of ethylene/isooctyl acrylate/C=O | 35.0 | 6.0 | 37.0 |
| HHH | E-94693-18D | Terpolymer of ethylene/isooctyl acrylate/C=O | 37.0 | 11.0 | 41.0 |
| III | E-9432L36A | Terpolymer of ethylene/n-butyl acrylate/C=O | 21.7 | 9.5 | 43.8 |

— = not applicable or not available.
C=O = carbon monoxide

EXAMPLES 1 TO 10 AND COMPARATIVE EXAMPLES 1 TO 15

Adhesive articles, identified as Examples 1 to 10 and Comparative Examples 1 to 15 in Table II, were prepared using release articles which were prepared from Resins A through Z, as indicated in Table II, as release materials. The substrate for each release article was a two layer film composite consisting of a 7.6 micron thick layer of polyethylene vinyl acetate (EVA) and a 14.2 micron thick layer of polyester, commercially available under the trade designation "SCOTCHPAK 135" from Minnesota Mining and Manufacturing Company (3M), St. Paul, Minn. Each release article was prepared by independently extruding a 38 micron thick layer of Resins A through Z as indicated in Table I onto the EVA side of the "SCOTCHPAK 135" film. The extruder used was a Haake Rheocord, commercially available from Haake Inc., Saddle Brooke, N.J. and the extrusion temperature profile was: zone 1=60° C.; zone 2=118° C.; zone 3=177° C.; and die temperature=177° C.

Pressure sensitive adhesive samples were prepared by coating a 25 micron thick layer of adhesive onto a 51 micron thick and 15 cm wide polyester backing utilizing standard hot melt coating techniques. The adhesive coated on the backing was a poly-alpha-olefin adhesive which was prepared using 85.75% 1-hexene having an I.V. of 2.2 (made using the procedure of Example 4 of U.S. Pat. No. 5,644,007), 12% hydrogenated polystrene tackifier (Regalrez 1139; commercially available from Hercules Incorporated, Wilmington, Del.), and 0.25% t-butyl anthraquinone (crosslinker; commercially available from Aldrich Chemical Company, Inc., Milwaukee, Wis.). The adhesive was then cured with ultraviolet radiation at 600 millijoules per square centimeter. The prepared adhesive samples were independently immediately laminated to the previously prepared release articles by placing the adhesive sample on the release article and then laminating the adhesive sample to the release article at a pressure of 1.8 kg/cm using a W. G. Laminator (Ser. No. MDS001049WG; from Warman International, Inc., Madison, Wis.) to form an adhesive article. The adhesive article was aged at 70° C. and 90% relative humidity (RH) for 3 days. The adhesive article was removed from the heated humidity chamber and allowed to cool to room temperature and 50% RH for 2 hours before cutting four samples of tape, each 2.54 cm wide and 15 cm long, and conducting the adhesion (i.e., release) testing.

Each tape was then removed from the release article using test method C of ASTM D 3330-90 (entitled "Peel Adhesion of Pressure-Sensitive Tape at 180° Angle") at a peel speed of 228.6 cm/min. The results for each adhesive article are set forth in Table II and are the average of four tests for each of the adhesive articles.

Each adhesive article was also evaluated for shockiness by audibly and visually (with the unaided eye) observing the tape as it was removed from the release article with the observer being about 25–30 cm from the sample. The adhesive article was rated as "Yes" for shockiness when removal of the tape sample was either noisy (i.e., raspy) or resulted in visible wrinkles in the tape during removal of the tape from the adhesive article or both. The adhesive article was rated as "Slightly Shocky (SS)" for shockiness when removal of the tape sample was either somewhat noisy or resulted in very few or minor (i.e., very superficial) wrinkles in the tape during removal of the tape from the release article or both. The adhesive article was rated as "No" for shockiness when removal of the tape sample was both quiet (i.e., smooth) and no wrinkles were visibly observed in the tape during removal of the tape from the release article. The results are set forth in Table II.

The data in Table II show that adhesive article examples E-3 to E-10 representative of the present invention have superior adhesion values (i.e., low adhesion values) and are particularly useful as release liners for PAO adhesives.

Although E-1 and E-2 exhibit adhesion values that may be too high for use as release liners, these values would be acceptable for use as LABs.

TABLE II

| Adhesive Article No. | Composition of Release Material (Resin from Table I) | Adhesion Results Value (g/2.5 cm) | Shocky |
|---|---|---|---|
| E-1 | A | 717.4 | SS |
| E-2 | B | 707.5 | SS |
| E-3 | C | 189.6 | SS |
| E-4 | D | 106.7 | SS |
| E-5 | F | 25.9 | SS |
| E-6 | G | 32.5 | SS |
| E-7 | H | 35.7 | SS |
| E-8 | I | 32.3 | SS |
| E-9 | J | 139.5 | SS |
| E-10 | K | 119.7 | SS |
| C-1 | R | 319.8 | Yes |
| C-2 | L | 342.4 | No |
| C-3 | M | 328.3 | No |
| C-4 | N | 285.8 | No |
| C-5 | O | 223.6 | No |
| C-6 | P | 163.9 | No |
| C-7 | Q | 243.4 | No |
| C-8 | S | 373.6 | Yes |
| C-9 | T | 396.2 | Yes |
| C-10 | U | 229.2 | Yes |
| C-11 | V | 586.5 | Yes |
| C-12 | W | 256.1 | Yes |
| C-13 | X | 275.9 | Yes |
| C-14 | Y | 194.8 | Yes |
| C-15 | Z | 271.7 | Yes |

EXAMPLES 11 to 18 and COMPARATIVE EXAMPLE 3

Resin M in Table I in pellet form was independently melt blended in various weight ratios with one of Resin E, Resin F and Resin G in Table I. The resultant blended resins were independently extruded as a 38 micron thick layer onto "SCOTCHPAK 135 film" substrate as described in Examples 1 to 10 and Comparative Examples 1 to 15. The extruder was a Haake Rheocord, commercially available from Haake Inc., Saddle Brooke, N.J. and the extrusion temperature profile was: zone 1=60° C.; zone 2=118° C.; zone 3=177° C.; die temperature=177° C.

Adhesive samples were prepared and laminated to the release material of each prepared release article, aged and evaluated as described in Examples 1 to 10 and Comparative Examples 1 to 15. The results for each adhesive article are set out in Table III and represent the average of four tape tests.

The data in Table III show the relatively high adhesion value as well as non-shocky release of an adhesive article comprising a release article of a copolymer of ethylene and n-butyl acrylate (Comparative Example C-3). However, when the adhesive article comprised a release article of a copolymer of ethylene and n-butyl acrylate (Resin M from Table I) independently blended with a terpolymer of ethylene/n-butyl acrylate/ C=O of the invention (Resins E, F or G from Table I), a significant decrease in adhesion values was observed, with slightly shocky release.

TABLE II

| Adhesive Article No. | Composition of Release Material (Resin from Table I; Weight Ratio) | C=O Content of Release Material (Weight %) | Adhesion Results Value (g/2.5 cm) | Shocky |
|---|---|---|---|---|
| E-11 | M:E; 15:85 | 8.5 | 29.5 | SS |
| E-12 | M:E; 30:70 | 7.0 | 33.1 | SS |
| E-13 | M:E; 45:55 | 5.5 | 61.6 | SS |
| E-14 | M:F; 15:85 | 8.5 | 31.2 | SS |
| E-15 | M:F; 30:70 | 7.0 | 59.0 | SS |

TABLE II-continued

| Adhesive Article No. | Composition of Release Material (Resin from Table I; Weight Ratio) | C=O Content of Release Material (Weight %) | Adhesion Results Value (g/2.5 cm) | Shocky |
|---|---|---|---|---|
| E-16 | M:G; 15:85 | 8.5 | 27.4 | SS |
| E-17 | M:G; 30:70 | 7.0 | 30.0 | SS |
| E-18 | M:G; 45:55 | 5.5 | 45.3 | SS |
| C-3 | M | 0 | 328.3 | No |

EXAMPLES 19 to 32 and COMPARATIVE EXAMPLES 16 to 53

Adhesive articles, identified as Examples 19 to 32 and Comparative Examples 16 to 53 in Table IV, were prepared using release articles which were prepared from Resins A to D, F, H to K, M, Q, S to X, AA to ZZ, AAA to III, as indicated in Table IV, as release materials. The release articles were prepared as described in Examples 1 to 10 and Comparative Examples 1 to 15

Four tape samples comprising a natural rubber based pressure sensitive adhesive having the trade designation "Tartan Masking Tape 200", available from 3M, were laminated to the release articles, aged and evaluated for adhesion as detailed in Examples 1 to 10 and Comparative Examples 1 to 15. The results are set forth in Table IV.

The data in Table IV show that adhesive article examples E-19 to E-32 representative of the present invention have suitable adhesive values for use as LABs with examples E-19, E-20, E-23, E-25, E-26, E-27, E-28, E-29, E-31 and E-32 exhibiting particularly preferred adhesive values for use as LABs.

TABLE IV

| Adhesvie Article No. | Composition of Release Material (Resin from Table I) | Adhesion Results (g/2.5 cm) |
|---|---|---|
| E-19 | J | 609 |
| E-20 | K | 637 |
| E-21 | A | 770 |
| E-22 | B | 756 |
| E-23 | C | 699 |
| E-24 | III | 744 |
| E-25 | I | 589 |
| E-26 | DDD | 657 |
| E-27 | F | 592 |
| E-28 | TT | 492 |
| E-29 | D | 501 |
| E-30 | H | 849 |
| E-31 | GGG | 529 |
| E-32 | HHH | 461 |
| C-16 | U | 1027 |
| C-17 | V | 858 |
| C-18 | W | 1010 |
| C-19 | X | 1115 |
| C-20 | AA | 948 |
| C-21 | BB | 1030 |
| C-22 | S | 1135 |
| C-23 | T | 1095 |
| C-24 | CC | 925 |
| C-25 | DD | 976* |
| C-26 | EE | 1670* |
| C-27 | FF | 1537 |
| C-28 | GG | 875 |
| C-29 | HH | 945 |
| C-30 | II | 1469 |
| C-31 | JJ | 1002 |
| C-32 | KK | 1276 |
| C-33 | LL | 974 |
| C-34 | MM | 897 |
| C-35 | NN | 1124 |
| C-36 | OO | 1387 |
| C-37 | PP | 1882 |
| C-38 | QQ | 914 |
| C-39 | RR | 1571** |
| C-40 | SS | 1135 |
| C-41 | UU | 1438 |
| C-42 | VV | 1412 |
| C-43 | WW | 1191 |
| C-44 | XX | 1041 |
| C-45 | AAA | 1528 |
| C-46 | YY | 900 |
| C-47 | ZZ | 1333** |
| C-48 | M | 1554*** |
| C-49 | Q | 1285** |
| C-50 | CCC | 1426 |
| C-51 | BBB | 1231 |
| C-52 | EEE | 1395 |
| C-53 | FFF | 1506 |

*Adhesive-cohesive failure.
**5% Adhesive transfer to LAB.
***10% Adhesive transfer to LAB.

What is claimed is:

1. An adhesive article comprising an adhesive composition comprising a poly-alpha-olefin-based adhesive or an acrylate-based adhesive and a release material thereon wherein the release material comprises a polymer derived from monomers comprising (a) ethylene, (b) alkyl (meth) acrylate or vinylacetate, and (c) carbon monoxide wherein the adhesive composition is selected to have a release value from the release material, as measured using test method C of ASTM D 3330-90, of greater than zero to about 200 g/2.5 cm.

2. The adhesive article of claim 1 wherein the release material is blended with an additional component comprising a material selected from honmopolymers, copolymers, or terpolymners of an olefin monomer having a formula $C_nH_2$, where n ranges from 2 to 20; homopolymers, copolymners, or terpolyniers of alkyl (meth)acrylates; vinyl acetate polymers including homopolymers, copolymers, or terpolymers of vinyl acetate; polyvinyl chloride; acrylonitrile-butadiene rubber; and derivatives thereof.

3. The adhesive article of claim 2 wherein the additional component comprises a material selected from copolymers or terpolymers of ethylene (meth)acrylic acid, including a metal neutralized form of such copolymers or terpolymers; copolymers or terpolyniers of ethylene vinyl acetate; and copolymers or terpolymers of ethylene alkyl (meth)acrylate.

* * * * *

UNITED STATES PATENT AND TRADEMARK OFFICE
CERTIFICATE OF CORRECTION

PATENT NO. : 6,465,091 B1  Page 1 of 1
DATED : October 15, 2002
INVENTOR(S) : Ou-Yang, David T.

It is certified that error appears in the above-identified patent and that said Letters Patent is hereby corrected as shown below:

Column 1,
Line 57, insert -- . -- following "thereof".

Column 5,
Lines 18 and 31, insert -- . -- following "thereof".
Line 46, insert -- . -- following "release".

Column 6,
Line 24, insert -- . -- following "thereof".

Column 7,
Line 51, insert -- . -- following "thereof".

Column 9,
Line 16, delete "an" and insert in place thereof -- can --.

Column 13,
Line 11, insert -- . -- following "suitable".
Line 44, delete "diff-using" and insert in place thereof -- diffusing --.

Column 22,
Line 48, delete "honmopolymers" and insert in place thereof -- homopolymers --.
Line 50, delete "terpolymners" and insert in place thereof -- terpolymers --.
Line 52, delete "copolymners" and insert in place thereof -- copolymers --.
Lines 52 and 60, delete "terpolyniers" and insert in place thereof -- terpolymers --.

Signed and Sealed this

Sixteenth Day of September, 2003

JAMES E. ROGAN
*Director of the United States Patent and Trademark Office*